United States Patent Office 3,455,094
Patented July 15, 1969

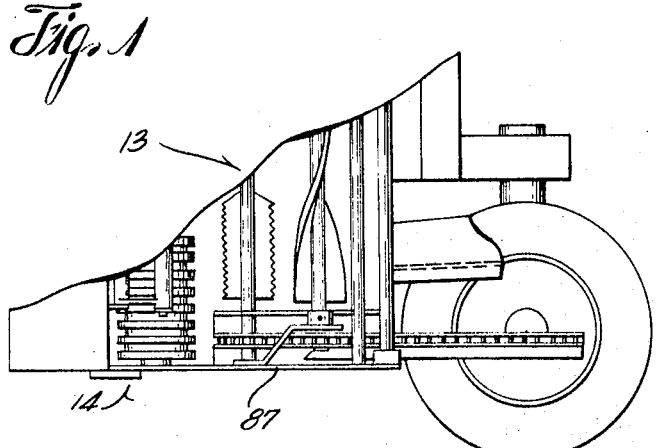
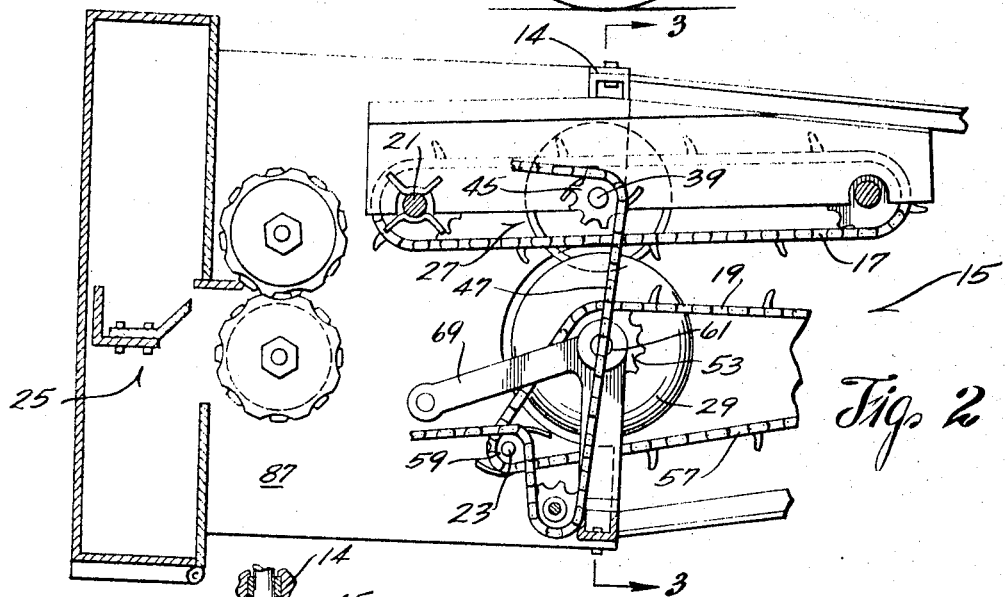
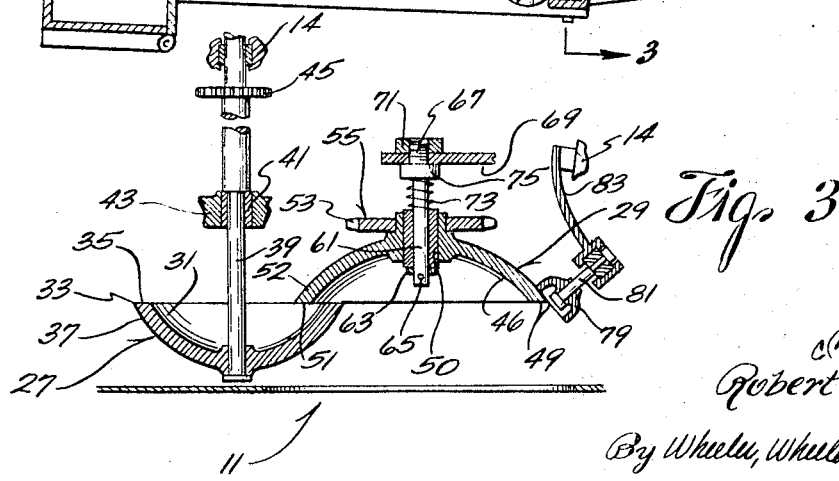

3,455,094
HARVESTER WITH OVERLAPPING DISC CUTTERS
Robert H. Gorham, P.O. Box 467, Kendall, Wis. 54638
Filed Apr. 11, 1966, Ser. No. 541,737
Int. Cl. A01d 49/00; B26d 1/24
U.S. Cl. 56—503                                   7 Claims

ABSTRACT OF THE DISCLOSURE

A crop cutting device having self-sharpening rotary blades which are adjustably biased together.

---

The invention relates generally to crop-cutting devices. More particularly, the invention relates to crop-cutting devices for harvesters, such as for example, the harvester shown in my earlier Patent No. 3,090,188.

One of the principal objects of the invention herein disclosed is to provide an improved rotary crop-cutting device which is self-sharpening, which is adjustable to vary the pressure or force between the self-sharpening, cutting elements and/or to separate the cutting elements, and which is power operated so that the cutting discs are driven at different peripheral speeds.

Another principal object of the invention is the provision of an improved cutting device which is economical to manufacture and which will provide reliable and effective service over a long and useful life.

Still another object of the invention is the provision of a rotary cutting device which operates with a minimum of vibration and which will not be hampered by clogging with accumulated grit or dirt, including grasses, weeds, and trash.

Still other objects and advantages of the invention will become known by reference to the following description and the accompanying drawings in which:

FIGURE 1 is a partial view of a crop harvester embodying various of the features of the invention;

FIGURE 2 is a sectional view taken horizontally through a portion of the harvester shown in FIGURE 1; and FIGURE 3 is a fragmentary view partially in section and taken along line 3—3 of FIGURE 2, showing the cutting device embodied in the harvester shown in FIGURES 1 and 2.

Shown in the drawings and particularly in FIGURE 3 is a cutting device 11 which embodies various of the features of the invention and finds particular utility in crop gathering and chopping devices such as disclosed in my earlier Patent No. 3,090,188. While cutting devices in accordance with my invention have utility apart from the specific structure shown in Patent No. 3,090,188, for purposes of description, the disclosed cutting device is shown as a component of a fragmentarily illustrated portion of the machine disclosed in my Patent No. 3,090,188. Reference is therefore made to my Patent No. 3,090,188 for a more complete description of the details of the machine in which the rotary cutting device is embodied.

Somewhat more specifically, there is shown in the drawings, a crop gathering and chopping machine or harvester 13 including a frame 14 which is adapted to be connected to a tractor and which supports a crop gathering, cutting and feeding means, generally indicated by the numeral 15. The crop gathering, feeding, and cutting means 15 includes a pair of opposed conveyors 17 and 19 which, as shown in my Patent No. 3,090,188 are driven through respective shafts 21 and 23 from a power source on a supporting tractor.

Also supported by the frame 14 is a crop chopping device which is indicated by the numeral 25 and which is more particularly disclosed in my Patent No. 3,090,188.

Included in the crop gathering, feeding, and cutting means is the crop cutting device indicated generally by the numeral 11 and embodying various of the features of the invention.

The crop cutting device 11 comprises generally lower and upper partially overlapping discs 27 and 29 which are rotatably mounted so as to be self-sharpening and so as to avoid any accumulation of grit or dirt which could hamper the cutting operation. In addition, the discs 27 and 29 are mounted so as to be power driven, preferably so that there is a difference in their peripheral speeds.

More particularly, while various shapes can be employed, the lower disc 27 includes a dish-shaped portion 31 which is concavely upwardly open. The lower disc 27 also includes a circular peripheral cutting edge 33 defined by angularly related surfaces, one surface 35 constituting an annular upper surface while the other surface constitutes a lower conical surface 37. Inwardly of the upper annular surface 35, the disc is preferably recessed as shown at 31. However, the particular shape of such recess can be widely varied.

The lower cutting disc 27 is fixed to a vertical shaft 39 which is rotatably carried, in part, in a bearing 41 supported by a member 43 included in the frame 14. Also carried by the shaft 39 is a gear sprocket 45 which is driven by a chain 47 which, as shown in my earlier Patent 3,090,188 also serves to drive the conveyors 17 and 19. Additional means, as desired, can also be employed to rotatably mount the shaft 39. While the lower disc is shown journalled from the top, it should be understood that various of the features of the invention can still be obtained if the shaft is journalled and driven from the bottom. However, it is preferred to drive and rotatably mount the lower disc from above.

The other or upper disc 29 can also be of various shapes and also includes a dish-shaped portion which, as shown in FIGURE 3, is concavely downwardly open. The upper disc 29 further includes a circular peripheral cutting edge 49 defined by angularly related surfaces, one surface 51 constituting an annular lower surface while the other surface constitutes an upper conical surface 52. Inwardly of the surface, the disc is preferably recessed, as shown at 47, but the particular shape of the recess can be widely varied.

The upper cutting disc 29 is fixed to a rotatably mounted bearing 50 which also carries a sprocket 53, thereby defining a cutting disc assembly 55. The sprocket 53 is driven by the conveyor chain 57 which, in turn, is driven by a sprocket 59 carried on the shaft 23, as is shown in my earlier Patent 3,090,188. The shaft 23, in turn, carries a sprocket which is driven by the same chain 47 which drives the shaft 39 carrying the lower cutting disc 27.

The cutting disc assembly 55 is carried on a vertical stub shaft 61 so as to locate the upper cutting disc 29 in partial overlapping relation to the lower cutting disc 27 and so as to afford partial engagement of the annular lower surface 51 of the upper disc 29 with the annular upper surface 35 of the lower disc 27. In addition, the cutting disc assembly 55 and the shaft 61 are arranged so as to afford variation in the pressure or force with which the discs 27 and 29 engage each other.

More specifically, the cutting disc assembly 55 is rotatably received on the shaft 61 and retained thereon by reason of a washer 63 and cotter pin 65 or other similar arrangement. The upper end of the shaft 61 includes a threaded portion 67 which is adjustably threaded into a bell-crank shaped bracket 69 supported by the frame 14, as shown generally in FIGURE 2. Threaded on to the upper end of the threaded portion 67 of the shaft 61 is a locking nut 71 which, together with the adjustable threaded connection of the shaft and supporting bracket, affords variation in the vertical relationship of the shaft 61 to the bracket 69.

The cutting disc assembly 55 is yieldably biased into engagement with the lower cutting disc 27 by means including a spring which, at its lower end, is seated against the bearing 50 and, at its upper end, bears against an enlarged portion 75 of the shaft 61 located below the threaded portion 67. Thus, the upper cutting disc 29 is located in partially overlying relation to the lower cutting disc 27 and is yieldably biased against the lower cutting disc 27 by an arrangement affording variation in the pressure between the discs, such means including both the vertical adjustability of the shaft and bracket and the action of the spring. Such yieldably biased engagement provides a self-sharpening action.

The drive arrangement is, preferably, such as to drive the discs 27 and 29 at differing peripheral speeds so that the sharpening action which occurs by reason of wiping of one disc against the other is uniformally distributed along both annular surfaces 35 and 51. Such difference in peripheral speed is obtained by reason of difference in the diameter of the discs 27 and 29, and in the difference in the size of the sprockets which effect disc rotation. Ultimately, the discs 27 and 29 are driven from the chain 47 which is also referred to by numeral 44 in Patent No. 3,090,188.

Means are also provided, as shown in FIGURE 3, for sharpening the conical surface 52 of the upper cutting disc 29. Such means comprises a stone 79 rotatably mounted on a pin 81 extending from one end of a leaf spring 83 which is fixedly supported at its other end at a remote point on the frame 14. As a result of such construction, rotation of the cutting disc 29 past the stone 79 provides for sharpening of the conical surface 52 to maintain the sharpness of the cutting edge 49. In operation, the leaf spring 83 serves to yieldably bias the sharpening stone 79 against the conical surface 52. Preferably, the rotatable mounting of the sharpening stone 79 on the pin 81 is such as to sufficiently restrain rotation so as to assure some relative movement between the stone 79 and the engaged surface 52 of the cutting disc 29 so as to afford a continuing sharpening action.

It should also be understood that an arrangement similar to the sharpening device just described can also be employed with the conical lower surface of the lower cutting disc.

In order to avoid accumulation of grit or other dirt which might hamper the operation of the cutting device, the floor plate 87 (i.e., the plate 23 in Patent No. 3,090,188) is generally semi-cylindrically recessed as shown in FIGURES 2 and 3 in the area below the cutting discs. The recessed area of the floor plate permits passage of any grit below the floor plate and back to the ground thereby preventing any accumulation. While various sized recesses can be employed, in the disclosed construction the recessed area is generally greater than the periphery of the upper cutting disc 29 and is generally concentric with the mounting of the upper cutting disc. If desired, a similar area underneath the lower cutting disc could also be recessed.

In operation, the cutting discs 27 and 29 are driven at different peripheral speeds so that the wear between the annular surfaces 35 and 51 which bear against each other will be uniformally distributed and so as to maintain the cutting edges 33 and 49 in sharpened condition to afford reliable cutting capability without attention from the owner or operator of the machine.

Various of the features of the invention are set forth in the following claims:

1. A crop harvester including a frame, rotary cutter means including a pair of rotatably mounted discs, one of said discs being provided with a peripheral cutting edge, means mounting said discs on said frame with peripheral portions in engaged overlapping relation, said means mounting said discs including means for adjustably varying the position of one of said discs relative to said frame in a direction parallel to the axis of disc rotation, and additional means for yieldably biasing said one disc toward the other of said discs.

2. A harvester in accordance with claim 1 wherein said cutting edge is defined by angularly related surfaces, one of said surfaces being engaged with the other of said discs, and including a sharpening member, means mounting said sharpening member on said frame for engagement with the other of said surfaces, and means associated with said mounting means for yieldably biasing said sharpening member against said other surface.

3. A harvester in accordance with claim 1 wherein said driving means includes a drive to the other of said discs and wherein said discs are driven at different peripheral speeds.

4. A harvester in acocrdance with claim 1 wherein said frame is open to the ground in the area below said one cutting disc.

5. A harvester in accordance with claim 4 wherein said frame includes a floor plate located below said cutting discs and wherein said floor plate is open at least in the area under said one cutting disc.

6. A harvester intended for forward, crop harvesting movement, said harvester including a frame having a floor plate, a casing mounted on said frame and including therein crop chopping equipment, and gathering, cutting, and feeding means mounted on said frame for crop delivery to said casing and including rotary cutting means comprising a first cutting disc having a dish-shaped portion and a peripheral cutting edge defined by a pair of angularly related surfaces, a first vertical shaft rotatably mounted on said frame and fixedly carrying thereon above said floor plate said first cutting disc with said dish-shaped portion being upwardly open and with one of said surfaces being generally horizontal, a cutting disc assembly including a second cutting disc having a dish-shaped portion and a peripheral cutting edge defined by a pair of angularly related surfaces, a sprocket, and a bearing fixedly connected to said second cutting disc and said sprocket, a second shaft including an intermediate enlarged portion, said second shaft receiving said bearing below said enlarged portion, means vertically mounting said second shaft on said frame so as to locate said second cutting disc with said dished portion of said second cutting disc opening downwardly, and with one of said angularly related surfaces of said second cutting disc in partially overlying engagement with said one angularly related surface of said first disc, said mounting means including means affording vertical adjustability of said second shaft relative to said frame, a spring encircling said second shaft and engaging said assembly and said enlarged portion so as to yieldably urge said second cutting disc into said engagement with said first cutting disc, and drive means connected to said first shaft and to said sprocket for driving said cutting discs at different peripheral speeds.

7. A harvester in accordance with claim 6 including a sharpening member, means mounting said sharpening member on said frame for engagement with the other of said surfaces of said second cutting disc, and means associated with said mounting means for yieldably biasing said sharpening member against said last-mentioned other surface.

References Cited
UNITED STATES PATENTS

| | | | |
|---|---|---|---|
| 147,453 | 2/1874 | Warth | 83—174 |
| 225,046 | 3/1880 | Binns | 83—501 |
| 1,319,366 | 10/1919 | Trogner | 83—501 |
| 2,826,032 | 3/1958 | Hayes | 56—255 |
| 3,090,188 | 5/1963 | Gorham | 56—503 |
| 3,178,873 | 4/1965 | Meyer | 56—27.5 |
| 3,181,406 | 5/1965 | Sayles | 83—174 |
| 3,315,452 | 4/1967 | Rossi | 56—295 |

ROBERT E. BAGWILL, Primary Examiner

U.S. Cl. X.R.

83—501